Dec. 30, 1947.  E. W. DAVIS  2,433,506
GREASE GUN WITH A FLUID PRESSURE FOLLOWER
Filed July 5, 1945   2 Sheets-Sheet 2

Inventor
Ernest W. Davis
By Williams, Bradbury & Hinkle
Attorneys

Patented Dec. 30, 1947

2,433,506

UNITED STATES PATENT OFFICE 2,433,506

GREASE GUN WITH A FLUID PRESSURE FOLLOWER

Ernest W. Davis, River Forest, Ill.

Application July 5, 1945, Serial No. 603,343

2 Claims. (Cl. 222—262)

1

My invention relates generally to lubricant compressors, and more particularly to hand operated grease guns of the lever type.

It is an object of my invention to provide an improved grease gun having means for priming the cylinder by a compressed air operated follower, the compressed air being supplied by a pump operated in conjunction with the operation of the plunger by which lubricant is forced from the cylinder.

A further object is to provide a grease gun having an improved filling means therefor.

A further object is to provide an improved grease gun, the operation of which will not be disadvantageously affected by the presence of air pockets.

Figure 1:
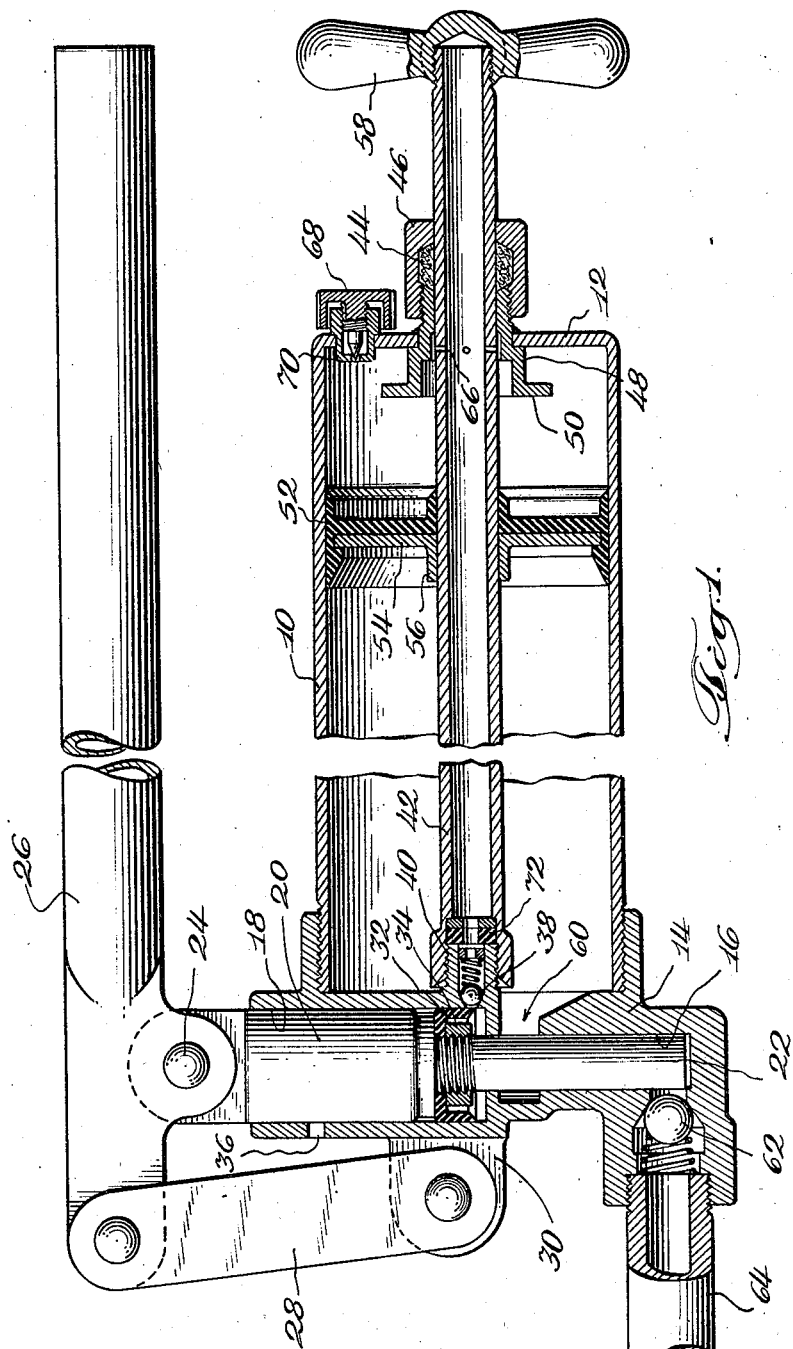
Figure 2:
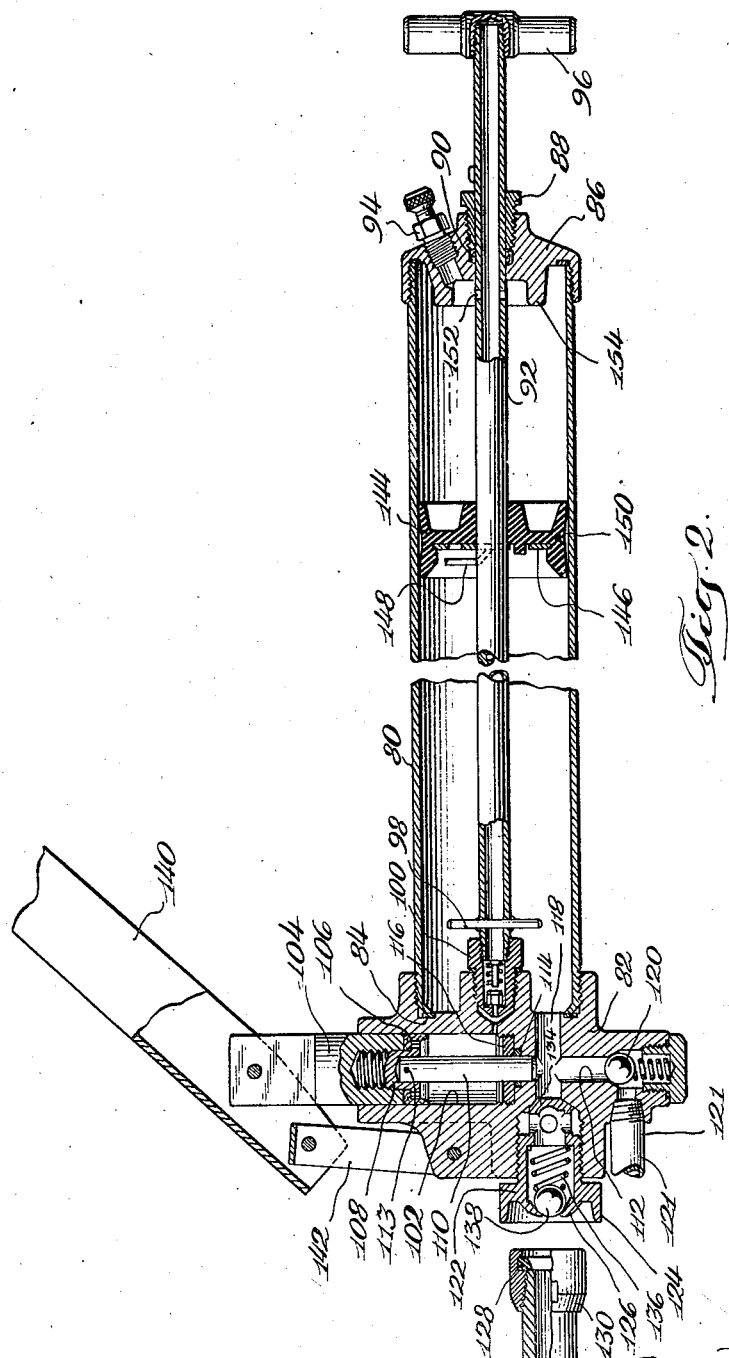

Other objects will appear from the following description, reference being had to the accompanying drawings, in which:

Fig. 1 is a central longitudinal sectional view of a grease gun incorporating the invention; and Fig. 2 is a similar view of a modified form of grease gun, incorporating improved filling means.

Referring to Fig. 1, the grease gun comprises a generally cylindrical barrel 10 having an integral end 12, the barrel being drawn from sheet metal. The open end of the barrel 10 is threaded in a flanged head 14, which is preferably a die casting. The head 14 is provided with a grease pump cylinder 16 and an air pump cylinder 18. A loose fitting piston or plunger 20 may have the high pressure plunger 22 formed integrally therewith, and at its upper end is flattened for pivotal connection by a rivet 24 with an operating handle 26, the end of the latter being pivoted to the end of a pair of links 28 which in turn are pivoted to a lug 30 forming part of the head casting 14.

A cup washer 32 is secured at the forward face of the piston 20 by a nut 34 threaded on the plunger 22 at its juncture with the piston 20. The head may have a port 36 for admitting air to the bore 18. The air compressed by the inward movement of the cup leather piston 20, 32, is discharged past a spring pressed outlet check valve 38 located in a threaded boss 40. A hollow follower piston rod 42 is threaded to the boss 40 and projects through the end 12 of the barrel, being made airtight by packing 44 compressed between a packing nut 46 and the end of a guide and follower stop element 48. The latter element is pressed into the end 12 and may be welded or soldered to make it airtight. The element 48 has a flange 50 which serves as a limit stop for a follower piston 52. This follower piston is preferably molded from a suitable synthetic rubber compound in the form of a double cup washer and is reinforced by a plate 54 having a cylindrical flange 56 engaging the hollow rod 42 to prevent tilting of the follower piston 52. The outer end of the hollow rod 42 is closed by a handle 58 threaded thereon.

Lubricant may flow from the adjacent end of the barrel 10 into the high pressure cylinder 16, through an inlet passageway 60 formed in the head casting 14, and lubricant discharged from the high pressure cylinder 16 flows past a spring pressed outlet check valve 62 to the discharge pipe or conduit 64.

Air compressed by the piston 20 is forced past the check valve 38 and flows through the hollow rod 42 and ports 66 therein to the right-hand end of the barrel 10, thus applying pressure to the follower piston 52 and forcing it and the grease to the left of it into the high pressure cylinder 16. This air pressure may be relieved, when it is necessary to fill the gun, by a needle valve 68 threaded in a valve body 70, the body 70 being preferably pressed and soldered in place.

To refill the gun, the needle relief valve 68 is opened to relieve the air pressure within the barrel 10, and the barrel is then unscrewed from the head 14. At the same time, the hollow rod 42 is unscrewed. The open end of the barrel is then immersed in a supply of grease and by pulling on the handle 58 the follower piston 52 is drawn upwardly, sucking in a quantity of grease, until further movement is arrested by contact of the follower piston 52 with the flange 50. The barrel may then be screwed back into the head 14 and the rod 42 screwed on the boss 40, it being noted that an airtight seal is effected between the hollow rod 42 and the boss by virtue of the provision of a sealing washer 72. The grease gun is then in condition for operation, and by relative oscillation of the handle 26 and the barrel 10, lubricant will be discharged from the high pressure cylinder by the plunger 22, while at the same time air will be discharged past the check valve 38 into the right-hand end of the barrel 10, thereby to apply pressure to the grease contained in the barrel.

In the modified form of the invention shown in Fig. 2, the barrel 80 is threaded in the head casting 82, a suitable gasket 84 being provided to seal this joint. The other end of the barrel is closed by a cap 86 threaded thereon, this cap being provided with a packing gland 88 to compress a packing 90 around a follower piston guide rod or tube 92. The head is also provided with an air relief needle valve 94. The hollow rod 92 has a handle 96 threaded to the end thereof, and has a cross pin 98 projecting diametrically through it adjacent its inner end. The pin is preferably sealed by solder or the like, so as to prevent the escape of air.

The inner end of the hollow rod 92 is threaded in a check valve fitting 100, which forms the outlet check valve for the air pump, the latter comprising a cylindrical bore 102 in which a plunger 104 is reciprocable. The plunger 104 has a cup leather piston 106 secured to the end thereof by a flanged bushing 108 threaded in the piston 104. This bushing 108 has a socket for the reception of the end of a high pressure plunger 110, which projects through an extension of the high cylinder bore 112. The plunger 110 is secured to the bushing by a pin 113. The connection between the plunger 110 and the bushing 108 provides sufficient play that the plunger may readily align itself with its cylinder 112. To prevent escape of air past the plunger 110, there is provided a packing 114, held in place by a packing gland 116.

Lubricant from the left-hand end of the barrel 80 flows through a passageway 118 to the high pressure grease cylinder 112. A spring pressed outlet check valve 120 prevents return flow from a discharge pipe 121 to the high pressure cylinder 112.

The left-hand end of the passageway 118 has a threaded enlargement for the reception of a combined lubricant receiving fitting and shutoff valve 122. This fitting has an externally knurled flange 124 and is provided with a surface 126 for cooperation with the sealing washer 128 of a nozzle 130 through which lubricant is to be supplied to the gun. The fitting 124 also has an apertured shutoff valve port 134 to close the left-hand end of the passageway 118. The valve part 134 is suitably pressed into the fitting 122 and provides a seat for a conical compression spring 136 which holds a ball check valve 138 in closed position. The compressor is operated by a handle 140 pivoted to the plunger 104, as well as joined to the body 82 by pivotal links 142 in the usual manner.

A follower piston 144 is freely slidable upon the tubular guide rod 92 and has a metallic reinforcing member 146 embedded therein. This member has a pair of arms 148 (only one shown) struck therefrom for bayonet-like locking engagement with the projecting ends of the pin 98.

The follower piston 144 is molded in the form of opposed cup washers and its generally cylindrical surface is relieved at the center, as indicated at 150, so as to assure good sealing contact with the inner surface of the barrel 80. The air pumped past the check valve in the fitting 100 is discharged through the hollow tube 92 and ports 152 to the right-hand end of the barrel, thereby to force the follower piston 144 to the left and prime the high pressure cylinder 112 with grease.

When it is desired to fill the compressor, the air pressure relief valve 94 is opened and the fitting 122 partially unscrewed so as to move the shutoff valve 134 from its seat. The fitting 122 may then make sealed connection with the nozzle 130 and lubricant under pressure supplied through the nozzle used to fill the barrel 80, pressing the follower piston 144 to the right. Movement of the piston to the right is limited by engagement with a suitable annular boss 154 forming part of the cap 86.

After the grease gun has been filled, the fitting 122 is screwed tight to close the shutoff valve 134 and the air pressure relief valve 94 is closed, whereupon the gun will be in condition for use.

In other respects, the grease gun of Fig. 2 is used in the same manner as that of Fig. 1; that is, as the handle 140 is oscillated back and forth, grease will not only be discharged past the outlet check valve into the conduit 121, but at the same time air under pressure will be supplied to the right-hand end of the barrel 80, thereby to place the grease within the barrel 80 under pressure, so that, upon retraction of the plunger 110 from the high pressure cylinder, the latter will be rapidly primed.

When a source of lubricant under pressure is not available for filling the grease gun shown in Fig. 2, it is filled in the following manner: The handle 96 is rotated to unscrew the fitting 100 from the head 82, and after relieving the air pressure by the valve 94, the barrel 80 is unscrewed. The handle 96 is drawn rearwardly to bring the projecting ends of the cross pin 98 against the reinforcing plate 146 of the follower piston and then rotated so as to lock the ends of this pin behind the pair of lugs 148. When this has been done, the open end of the barrel 80 is immersed in a supply of grease and the handle 96 pulled outwardly to suck in a quantity of grease. If, through inadvertence, or due to the presence of a large air pocket in the supply of grease, a substantial amount of air is admitted to the barrel 80, the operator may push the handle inwardly to discharge such air and whatever grease may have been drawn into the barrel, and make another attempt to fill the barrel solidly with grease. It is for this reason that the bayonet-like detachable connection between the follower and hollow guide rod 92 is necessary.

After the barrel has been filled with grease, the relief valve 94 is closed and the barrel screwed into the head, the guide 92 rotated to disengage the pin 98 from the lugs 148, and the fitting 100 again screwed into the head 82 to provide an airtight path for the flow of air from the air pump to the outer end of the barrel 80.

From the foregoing, it will be clear that I have provided a novel grease gun which is in effect self-priming, which may be easily filled and operated, and in which the presence of pockets of air in the grease will not materially interfere with its satisfactory operation.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a lever type grease gun, the combination of a head having a pair of aligned cylinders of different diameters, a two diameter plunger having portions respectively guided in said cylinders, a cup leather secured to the larger diameter portion of the plunger to form a piston and air inlet valve, a barrel secured to the head and having its interior communicating with the smaller diameter cylinder, a follower piston freely movable in the barrel, a hollow guide rod for said follower piston, said guide rod being secured to said head, a check valved passageway connecting the larger of said cylinders with said guide rod, said guide rod having an opening for conducting air to the end of said barrel remote from the head, and manually operable means for reciprocating said plunger comprising a handle pivoted intermediate its ends to the outer end of the plunger and a link having its ends pivotally connected to the end of the handle and to the head respectively.

2. In a hand operated lubricant compressor, the combination of a head having a large cylinder and a small cylinder formed therein, said cylinders being in substantial alignment and adjacent one another, a plunger having a small diameter portion operating as a piston in the small cylinder and having a large diameter portion guided in the large cylinder, an air pump comprising a flexible cup piston secured to the large diameter portion of the plunger, and an outlet check valve; a barrel detachably secured to the head and communicating with the small cylinder therein, a follower piston freely movable within the barrel, a hollow rod for guiding said follower piston, said rod being secured to the head and forming a passageway for the discharge of air therefrom to the end of the barrel remote from the head, an outlet check valve for the small cylinder, a handle pivoted to said plunger, and a link pivotally connected to the handle and to the body.

ERNEST W. DAVIS.

REFERENCES CITED

The following references are of record in the file of this patent:

UNITED STATES PATENTS

| Number | Name | Date |
|---|---|---|
| 1,668,002 | Brown | May 1, 1928 |
| 1,659,950 | Goodman | Feb. 21, 1928 |
| 1,884,507 | Bacher | Oct. 25, 1932 |
| 1,972,181 | Chambers | Sept. 4, 1934 |

FOREIGN PATENTS

| Number | Country | Date |
|---|---|---|
| 149,907 | Austria | June 10, 1937 |